Jan. 11, 1966   B. BERGHAUS ET AL   3,228,809
METHOD OF REGULATING AN ELECTRIC GLOW DISCHARGE
AND DISCHARGE VESSEL THEREFOR
Original Filed Dec. 8, 1954   6 Sheets-Sheet 1
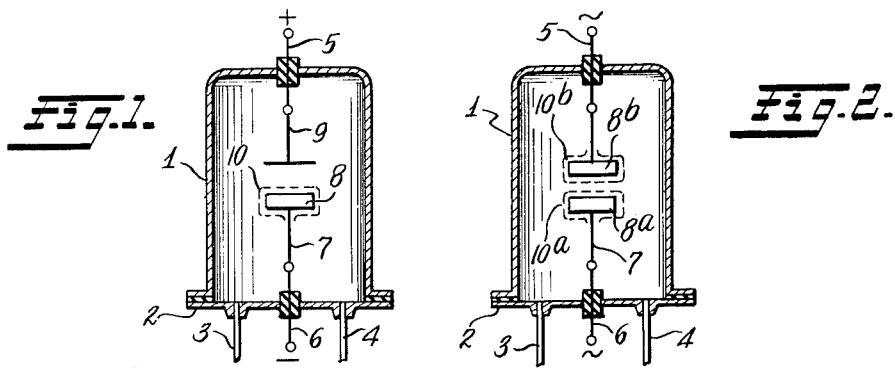
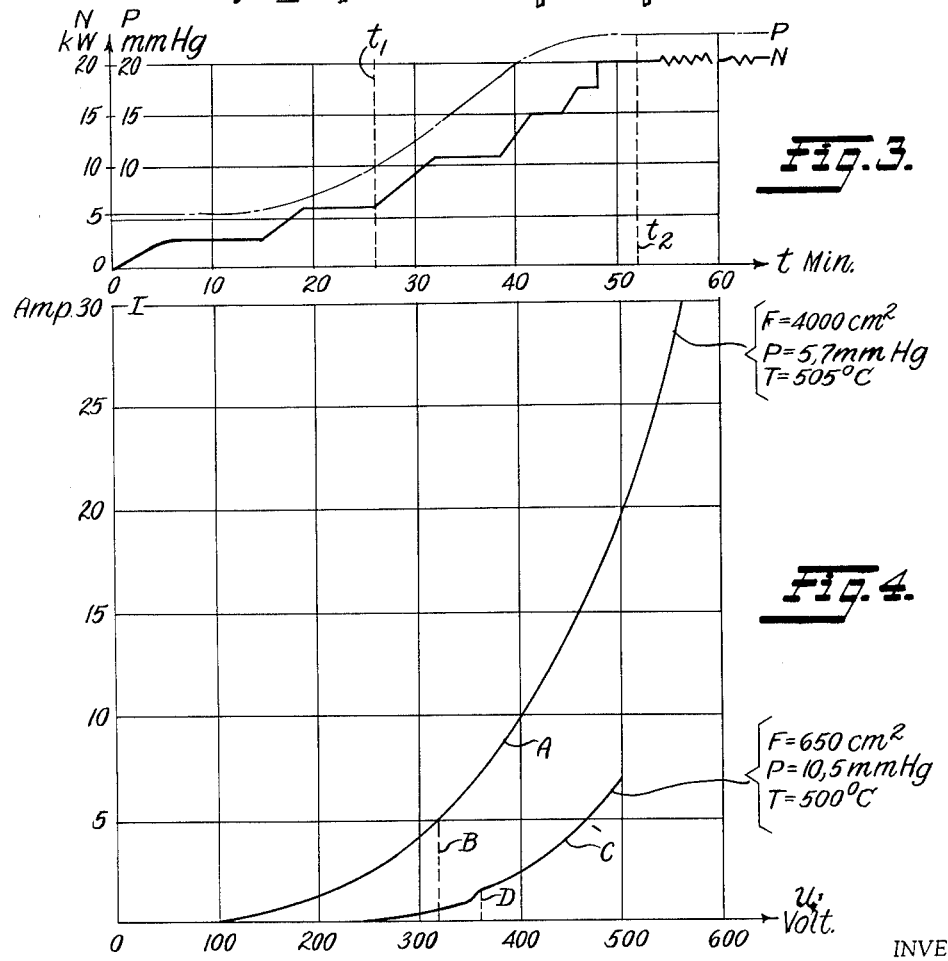
INVENTORS
Bernhard Berghaus
Hans Bucek
BY Bacon & Thomas
ATTORNEYS INVENTORS
Bernhard Berghaus
Hans Bucek
BY Bacon & Thomas
ATTORNEYS

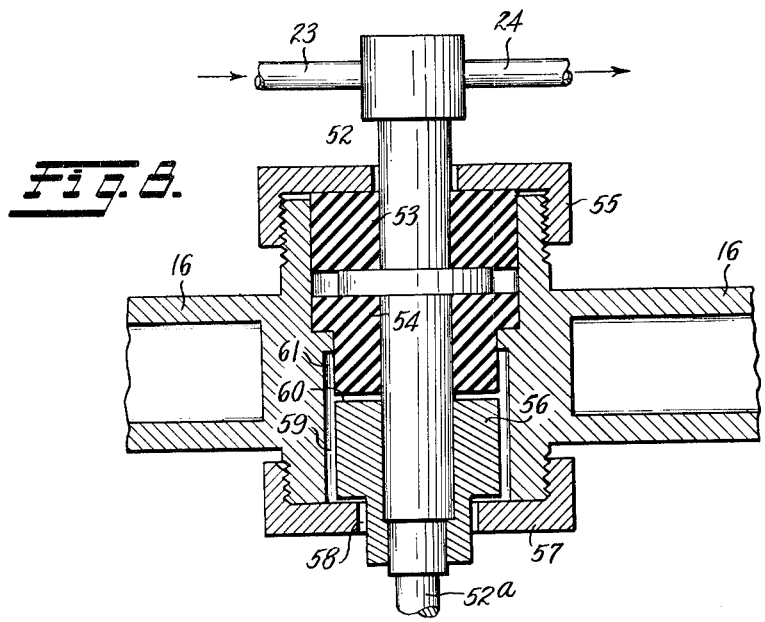
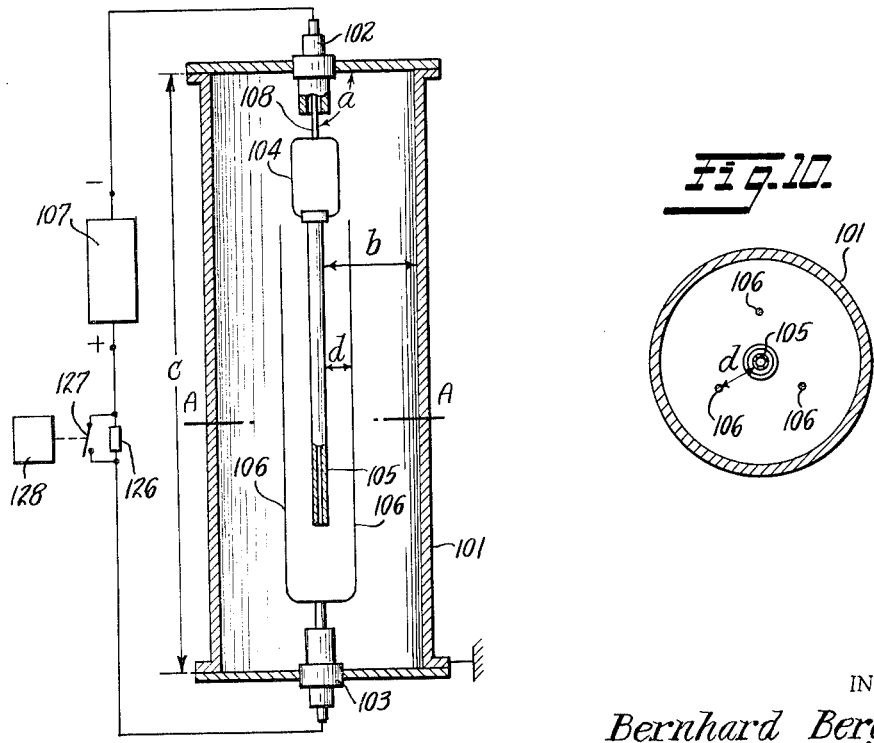

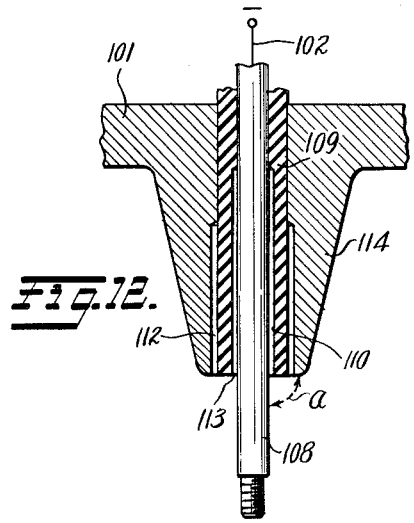
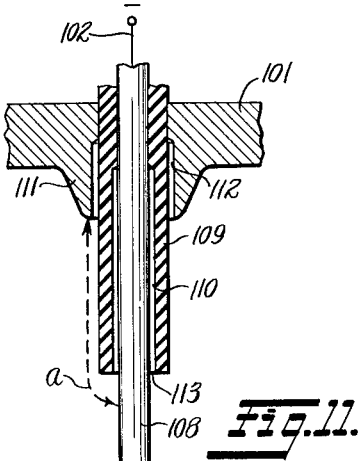
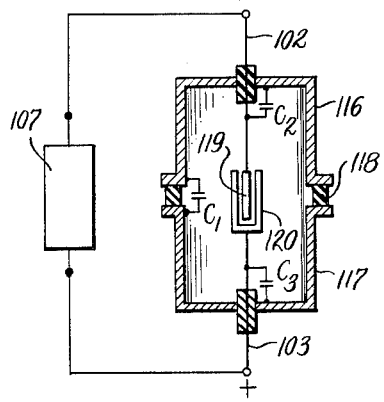
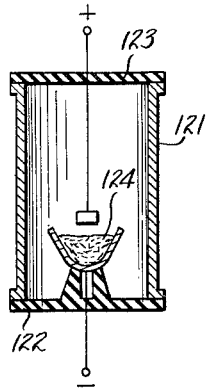
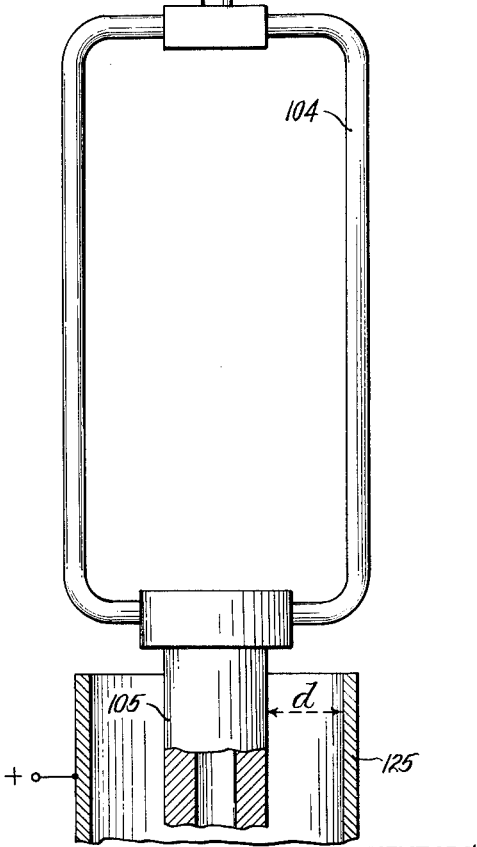
INVENTORS
Bernhard Berghaus
Hans Bucek —— $\frac{R_i}{R_0} = f(I\,Amp)$     ---- $\frac{R_i}{R_0} = f(NkW)$ United States Patent Office 3,228,809
Patented Jan. 11, 1966

3,228,809
METHOD OF REGULATING AN ELECTRIC GLOW DISCHARGE AND DISCHARGE VESSEL THEREFOR
Bernhard Berghaus and Hans Bucek, Zurich, Switzerland, assignors to Elektrophysikalische Anstalt Bernhard Berghaus, Naduz, Liechtenstein, a corporation of Liechtenstein
Original application Dec. 8, 1954, Ser. No. 473,895. Divided and this application Sept. 24, 1962, Ser. No. 225,714
9 Claims. (Cl. 148—16)

The present application is a continuation-in-part of application No. 627,685 filed December 11, 1956, now abandoned, which in turn was a continuation-in-part of application Serial No. 579,935, filed April 25, 1956, now abandoned, which in turn was a division of our application Serial No. 473,895, filed December 8, 1954, and now abandoned.

The present invention relates to a process for the regulation of electric glow discharges in discharge chambers for carrying out various operations on materials subjected to the action of the discharges.

In the application of glow discharges in a vessel having a reduced pressure for the purpose of performing metallurgical, chemical or other technical processes, metallic discharge vessels are commonly employed. Such processes always require that the material treated be at an elevated temperature. In electric glow discharges of this type, the material treated, such as a metal workpiece to be improved at its surface, has a continuous or temporary negative voltage applied to it so that the effective cathodic glow discharge may cover the surfaces of the workpiece involved in the process as completely as possible. The supply of electric energy required to the material treated is usually effected via one or several current lead-ins incorporated in the metallic walls of the vessel and having an insulated internal lead which conducts a cathodic potential, continuously in direct current operation and intermittently in alternating current operation.

In the operation of such discharge vessels the well-known difficulty has arisen that not only the material being treated but all other metal members having a cathodic potential, e.g. the internal lead of the current lead-in, are covered by a surface glow and thus take part in the discharge process. This causes, on the one hand, unnecessary heating and loss of energy in the members involved, such as the holders for the material treated and, on the other hand, destructive reactions, particularly at the current lead-ins, where especially heavy damage takes place at the points of contact between the internal lead and the insulating material facing the interior of the vessel. This well-known phenomenon, which substantially reduces the life of such lead-ins, has made it advisable to use a system of narrow gaps between the internal lead and the insulator in order to protect the point of contact between the internal lead and the insulator situated at the bottom of the system of gaps against the action of the destructive glow discharge, since experience has shown that glow discharges are largely inhibited or completely eliminated in a sufficiently narrow gap. The favorable effect of such gap systems has resulted in various, usually rather complicated, designs of insulated current lead-ins, in which narrow protective gaps are provided between the internal lead on the one hand and the insulator and possible metal parts connected with the insulator holder and the housing on the other.

The use of protective gaps around the internal lead of the insulated current lead-ins has so far constituted the only known means of eliminating the destructive glow discharge at the sensitive points of the lead-in. Such lead-ins have proved perfectly useful, in particular in the operation of discharge vessels having a very low gas pressure of not more than a few millimetres of mercury. However, it often occurs that a relatively high temperature, e.g. over 500° C., of the material to be treated is desirable in glow discharge processes, which requires a correspondingly large supply of energy. If lower gas pressures below 1 mm. mercury were employed, a relatively high operating voltage of far above 1000 volts would be necessary, which would not be advantageous owing to insulation difficulties and the complicated current lead-in installations. It is accordingly more advantageous to operate at higher pressures, such as in the range of 5 to 20 mm. mercury, to obtain temperatures up to 1000° C. by the use of much higher discharge current densities at far lower operating voltages, e.g. between 400 and 1000 volts.

At gas pressures above 5 mm. mercury the protective gap system loses much of its effectiveness for at gas pressures of only 100 mm. a gap of .5 mm. width cannot substantially prevent glow discharges from entering the gap, and the reduction of the gap width involves difficulties in design and operation. While current lead-ins have been provided in which gap systems having a width of .2 mm. can be controlled by means of particular centering measures, such narrow gaps cannot prevent destructive glow discharges from entering the gap at pressures above 10 mm. mercury. Accordingly, in the pressure range of above approximately 1 mm. mercury, other suitable measures are desirable in order to protect the current-lead-ins against the destructive influence of high-energy glow discharges.

The present invention relates to a method of performing such glow-discharge processes by which it is possible largely to circumvent the undesirable glow discharges, in particular at the current lead-ins.

It is a characteristic feature of the invention that in order to prevent a discharge from having an impact on the lead-ins beyond the maximum admissible value, the atmosphere used for the treatment, the properties of the electrodes and the geometrical arrangement of the electrodes in the receptacle are so adapted to the surfaces involved in the process that the maintenance of a discharge thereon is favored and in the end condition of the discharge a predetermined division of the output in favor of certain surfaces is produced. In this case the specific output on these surfaces is predetermined, while as regards at least a part of the other constructional elements carrying voltage the specific output is smaller.

As regards the atmosphere of the treatment, the kind of the gas and the gas pressure are determining factors, whilst as regards the properties of the electrode, it is the electric conductivity and the electric behavior of the boundary layer between surface and gas that are important. The geometrical arrangement of the electrodes in the receptacle comprises the surface ratios (electrode to counter-electrode, or to constructional support, or to wall), the distances (between electrode and electrode, and between electrode and wall) as well as the conditions of shapes (total surface, surface parts facing one another). Also of importance are a limiting voltage and a limiting gas pressure which will be explained in detail below.

By means of the method according to the invention it is possible while maintaining a predetermined density of energy at the surfaces involved in the process, to create a state of discharge and, in so doing, not to go above that limiting voltage at the electrodes or below that limiting gas pressure at which the high-energy glow discharge covers all the at least intermittently negative structural members. If discharge is conducted with a voltage lower than the limiting voltage and a pressure higher than the limiting gas pressure while a suitable discharge space resistance is chosen at the surfaces involved in the process, the glow discharge will tend to withdraw from the current lead-ins thus ensuring that the voltage carrying members of the current lead-ins will be relieved of energy in favor of the surfaces involved in the process.

The discharge vessel according to the present invention for the performance of the process is provided with walls formed largely of metal, and having at least one insulating current lead-in and at least one additional supply point, holders for the material to be treated and counter-electrodes. The discharge vessel is characterized by the fact that the areas assigned to the process surfaces are arranged and dimensioned in area in such a manner relative to the distance and area conditions at the point of entry of the internal lead of the current lead-in which is securely connected to the material to be treated and the adjacent metal parts connected to the other points of supply, as to create a condition which favors the discharge in the vicinity of the process surfaces.

Various embodiments of the invention are hereinafter described with reference to FIGURES 1–18 of the accompanying drawing, in which:

FIGS. 1 and 2 are each diagrammatic representations of a discharge receptacle and are intended to explain the method;

FIG. 3 is a diagram showing the starting process;

FIG. 4 is a current/voltage characteristic for a glow discharge according to the invention;

FIG. 8 is a longitudinal section of a leading-in insulator for the discharge receptacle shown in FIG. 7;

FIG. 9 is a longitudinal section of a further embodiment of a discharge vessel in diagrammatic view;

FIG. 10 is a cross section of the discharge vessel according to FIG. 9 along line A—A;

FIGS. 11 and 12 are longitudinal sections of the cathodic current lead-in of the discharge vessel according to FIG. 9;

Figure 15:
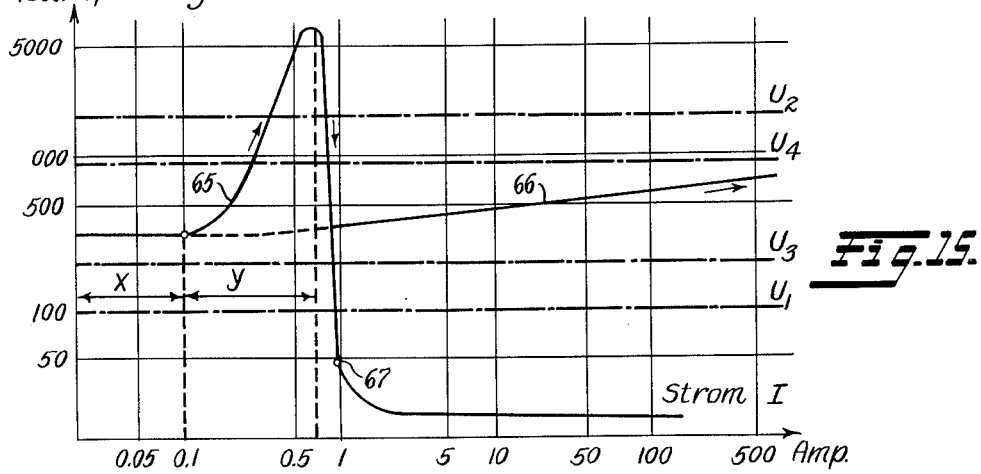
Figure 16:
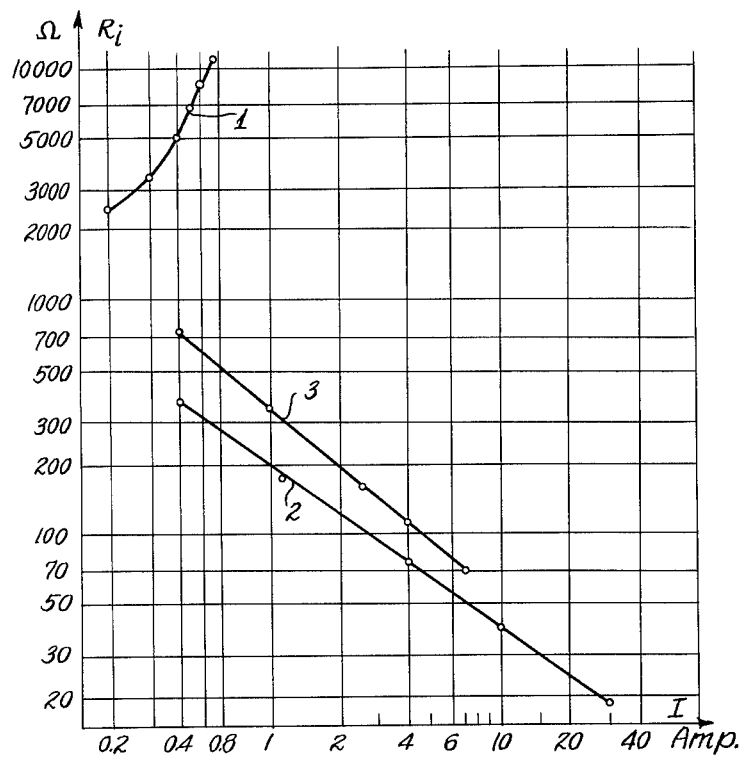
Figure 18:
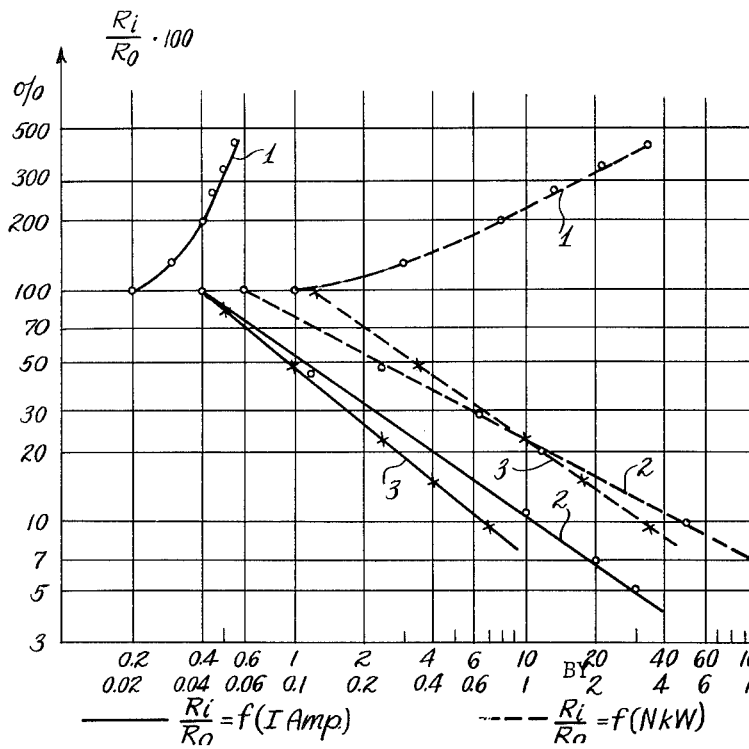

FIGS. 13 and 14 each show a further embodiment of discharge vessels;

FIG. 15 shows the current/voltage characteristic of a prior art glow discharge and a glow discharge of the present invention;

FIGS. 16–18 are diagrams for the inherent resistance of two kinds of glow discharges.

The method according to the invention is based on the knowledge, consolidated by many years of experimentation, that the high transformation of energy required for the carrying out of metallurgical and chemical processes by means of glow discharges on an industrial scale can be attained in a discharge vessel in the case of continuous operation only when a very substantial condition of discharge can be reached and maintained. This is clear in view of the fact that a transformation of energy on the surfaces participating in the process, of the order of 30–50 watts per sq. cm. and 20,000 watt per treated workpiece, is required and is obtainable in continuous operation for several days, and can be maintained without difficulty. The technical processes which can be carried out by means of glow discharges include: the diffusion of substances into metal surface, for instance incorporation of nitrogen, boron, silicon, tungsten, etc., as well as processes of a chemical character, such as reductions, hydrations, polymerization, etc.

In such large-scale industrial glow discharge processes, temperatures of 300° C. and above must be produced on the material to be treated. In view of these temperatures, the high energy transformation and the large workpiece or quantities of material to be treated, only discharge vessels built of iron or other suitable materials having large dimensions can be used. The current lead-ins through the walls of such vessels, since they are often used to hold the material to be treated, are very sturdily built while the counterelectrodes—which are usually connected with a second current lead-in—have a substantial area or length.

With such spatial dimensions and the high capacities between the structural members and the large dimensions of the vessel, the simple principles of glow discharges established with experimental apparatus usually formed of glass are of little importance since they are strongly influenced and largely overlapped by secondary effects. While conditions in the range of the cathodic glow edge are more or less in accord with the known rules, conditions obtained in the remainder of the discharge space are entirely different owing to the usually extended paths for the charge carriers. The application of the present process is expressly limited to glow discharge vessels and electrodes having large dimensions, i.e. to glow-discharge equipment beyond the range of radio and glow tube engineering.

Obviously, such a treatment can be reliably carried out only when it is possible to concentrate the powerful glow discharge upon the surfaces to be treated or otherwise taking part in the technical process, and upon the layer of gas directly adjacent thereto, whether these surfaces are metal workpieces, or only supports for the substances to be treated. This concentration of the energy transformation upon definite surfaces or gas layers is firstly required for reasons of economy, since only on the surfaces that participate in the process does an energy transformation take place which is useful and contributes to the carrying out of the process, whilst the energy transformation that takes place at other points in the discharge receptacle, such as the leading-in insulators, the work-piece supports, the surfaces of the workpiece which have not to be treated, walls, etc., represents a loss in output. In addition, a discharge leak, for instance from the one electrode to the conducting wall and from there back to the other electrode reduces efficiency and must be avoided. Further for reasons of safe operation, it is absolutely essential to divide up the output with at least a partial concentration of the energy transformation on the surfaces participating in the process, since—as already mentioned above—the other voltage carrying constructional parts, and more particularly the leading-in insulators, ought not to receive during continuous operation the impact of more than a definite relatively low discharge. These technical data thus compel the output of the discharge on the energy-favored surfaces to be increased while at the same time relieving other surfaces, more particularly the leading-in insulators, in order to enable technical processes of the above-mentioned nature to be carried out at all safely.

As is well known, the current/voltage characteristic 65 (see FIG. 15) of a gas discharge receptacle operated, by way of example, with direct-current voltage reveals a so-called stabilizing range $x$ at which, while the electrode voltage remains constant, the discharge receptacle can take currents of varying intensity. This stabilizing effect is caused by the progressive glow covering of the electrode connected as cathode. It is thus not normally possible to increase the energy transformation in the discharge receptacle by raising the voltage at the electrodes when there is a predetermined, only partial glow covering of the electrode, since any increase in voltage results first of all in an enlargement of the glow covering. If with such a normal glow discharge, the current is increased more and more, said discharge will finally reach the so-called abnormal range $y$ of the characteristic and the cathode drop in front of the electrode connected as the cathode rises, which, with a further increase in current, however, leads to the production of a very small area of impact on this electrode and causes beyond the range y in FIG. 15 another form of discharge (point 67) known as an electric arc which is quite unusable for the present purpose. In order, therefore, while favoring the surfaces to be treated in respect of energy, to increase the energy transformation in the discharge receptacle and the specific output on these surfaces to practically any extent desired, completely different discharge condition must be created which represent essential features of the method according to the invention. The hitherto known glow discharge according to the voltage/current characteristic 65 of FIG. 15 is not suitable for producing the desired high energy density at the surfaces to be treated because beyond the range y the glow discharge turns up to an arc discharge. "Specific output" as herein used always refers to the output transformed per unit of area, or the output transformed pre unit of volume in the gas layer.

The method according to the invention requires special measures which assist the maintenance of a discharge on the surfaces participating in the process. One of these special measures consists in carrying out a starting process, on completion of which the stationary condition of the discharge is attained, which condition takes place with predetermined energy transformation and predetermined division of output in respect to the voltage carrying surfaces and can be maintained in continuous operation, the energy transformation and the specific output not exceeding predetermined maximum values on any of the surfaces not participating in the process. The method is in no way limited to definite arrangements of the electrodes and to definite shapes of the surfaces participating in the process and can be used practically in all cases that may occur, as long as the arrangement is carried out as required by each case. In any event, however, the figures, used hereinafter to explain the method, are only diagrammatically reproduced examples of suitable arrangements and discharge receptacles. As is described below, the carrying out of a process according to the present invention requires that it be carefully planned in accordance with the results desired and being based on certain rules described hereinafter.

The discharge receptacle shown in FIGURE 1 for carrying out such a process is adapted to operate on a voltage of constant polarity, but not necessarily of constant amplitude. The same comprises the removable upper part 1 and the bottom part 2, both preferably consisting of an electrically conducting material such as metal. The parts 1 and 2 are connected together in a gas-tight manner, and a gas atmosphere of any pressure and any composition may be produced inside through the gas suction pipe 3 and gas supply pipe 4. The upper part 1 is provided with an insulated lead-in 5, which in this case represents the anode connection, and a corresponding insulated lead-in 6 is provided in the bottom part 2, the same acting as a cathode connection; both lead-ins are built in a gas-tight manner in the corresponding walls 1 and 2. The lead-in connection 6 supports, by means of suitably formed holders 7 the article to be treated in the technical process; in this case, for instance, the metal workpiece 8. Opposite the latter there is provided an electrode 9, which is secured to the lead-in connection 5 and represents the anode, but which should itself not participate in the technical process to be carried out. The problem now is, to limit the powerful glow discharge, indicated in dotted lines by 10 in FIGURE 1, as much as possible to the outer surfaces of the workpieces 8 participating in the process, and to attain there a predetermined value of the energy transformation for a predetermined specific output, without the other voltage carrying parts, viz. the inside of the lead-in connections 5 and 6, the holders 7 and the electrode 9, showing any glow discharge impact exceeding the admissible maximum. Also the inner walls of the receptacle parts 1 and 2 should be as free as possible from such disturbing glow discharges and energy losses resulting therefrom.

The same problem arises also in connection with alternating current operation of such a discharge receptacle 1, 2, but, as shown in FIGURE 2, in this case there is no longer any difference between the anode and the cathode, for which reason now two workpieces 8a, 8b can be subjected simultaneously to the desired process, which workpieces are secured to the one and the other holder 7 and 9 respectively and are connected with the lead-in connections 6 and 5 respectively. The powerful glow discharge 10a and 10b should be limited as much as possible to the other outer surfaces of the workpieces 8a and 8b participating in the process.

This problem—quite unsolvable in the glow discharge technique hitherto known, as regards the outputs required for technical purposes—is only solvable when the desired end state of the gas discharge is produced through the starting process hereinafter described. However, in the widely differing technical processes used in actual practice and with the different forms of workpieces as well as the possible reactions of the surfaces that are participating in the process, etc. a careful preliminary planning of the required process is understandably necessary. As regards discharge receptacles similar to those shown in FIGURES 1 and 2 with electrically conducting walls at least on the internal sides, the following rules have to be taken into consideration for the planning of the desired process, the said technical values having to be ascertained, if necessary, by preliminary tests.

*Gas pressure.*—The required minimum pressure is given by the stipulation that as regards the desired specific output on the surfaces participating in the process, the same are always completely and uniformly covered by the powerful glow discharge.

The pressure must not, under any circumstances, fall below that minimum value at which the less powerful glow discharges arising at the relieved voltage carrying parts, and more particularly at the lead-in connections, do not exceed the maximum impact of the discharge for these parts.

*Gas atmosphere.*—The composition of the gas atmosphere comprising individual gas components is determined by the kind of process that is carried out. According to the amounts of the individual gas components which are consumed or freely generated during the process, their replacement or removal is effected by a suitable gas supply and gas suction, the prescribed gas pressure in the discharge receptacle being maintained.

*Arrangement of electrodes.*—The distance between the energy-favored surface participating in the process, and the corresponding counterelectrodes (which in the case of alternating current operation may also be surfaces participating in the process), should be small in comparison with the area of the surfaces participating in the process. This distance will hereinafter be referred to as "electrode distance."

Compared with the "electrode distance," the distance between all the voltage carrying parts and the walls of the receptacle should be as great as possible.

As regards the "electrode distance," however, there is a limiting stipulation, namely, that the same must not be made smaller than double the thickness of the cathode drop space of the glow discharge in the intermediate space of the electrodes.

*Shape of the surfaces.*—The surfaces participating in the process are generally given; however, it is advantageous to make the same as large as possible as compared with the sum of the surfaces of all energy-relieved voltage carrying parts. If, for instance as in the case of hollow spaces, surfaces of the same potential lie opposite each other, the so-called "hollow cathode effect" has to be taken into consideration, the same giving a higher energy yield of the glow discharge, as soon as the thickness of the cathode drop space exceeds approximately one-fourth the distance between these surfaces.

*Size of receptacle.*—The minimum size is determined by the required wall distances of the voltage carrying parts, as well as the size of the surfaces participating in the process. On the other hand, the above-mentioned stipulation of a surface area as small as possible for all surfaces not participating in the process determines the maximum admissible size of the discharge receptacle.

*Behavior of the surfaces participating in the process.*— In addition to the area and shape of the surfaces participating in the process, their behavior with respect to the conditions of the starting and end states has to be taken into consideration. Especially, their capacity of emission at the stipulated temperature of the process, and under the intensive ion bombardment, is important, as well as the gas delivery to be expected, evaporation, gas absorption and other properties of the material.

In the above-mentioned starting process, the gas pressure and the electrode voltage are so adjusted at the beginning so as to be adapted to the electrode arrangement provided according to the above-mentioned rules, and to the required initial temperature, and effect a glow discharge which is of any desired extent. The electrode voltage and the gas pressure are advantageously so chosen that in the initial phase of the starting process all voltage carrying parts are covered by a glow layer. The insulating lead-in connections 5 and 6 are sensitive to the detrimental effects of even the glow discharges of little power produced during the starting process and are provided with means, hereinafter described, capable of protecting them.

The phase of the starting process wherein all voltage carrying parts are covered with a glow discharge is continued until the defects of the surface layers are removed. After removal of all or any imperfections in the surface layer, the glow covers the voltage carrying surface uniformly. Now, the gas pressure and, generally, also the electrode voltage are continuously increased whereby the specific output of the discharge at the surfaces participating in the process is increased and the energy transformation is increased in steps. However, the specific output of the glow discharges at the surfaces not participating in the actual process is not increased to the same extent, and in certain circumstances is even reduced, so that the energy transformation is mainly limited to the desired surfaces, which, therefore, are heated up gradually, approaching the temperature required for the metallurgical or chemical process to be carried out. This end state of the discharge is reached after a starting period of time, which is characteristic for each process and the kind and size of the participating surfaces or layers of gas, whereby a division of output is attained and the powerful glow discharge is largely concentrated upon the surfaces participating in the process, showing there a predetermined value of specific output and of energy transformation, whilst at all the other voltage carrying parts, especially at the lead-in connections, the discharge impact does not exceed a given maximum. If desired, the glow discharge during the starting process may be stabilized by the insertion of a series impedance, for instance an inductive impedance, in the supply circuit of the electrodes. Instead thereof, or additionally thereto, a practically inertia-free control of the electrode voltage may be provided, which, upon a predetermined adjustable maximum current being exceeded, or upon dropping under and adjustable minimum voltage, effects a voltage drop of short duration to a predetermined value, or switches off the voltage altogether. The purpose of both these measures is to avoid an inadmissible strong local heating of individual surfaces when great irregularities suddenly arise in the surface layer, as for instance in the case of gas eruptions.

The starting process must always begin with a smaller energy transformation and lower specific output than is provided for the end state aimed at; that is, the output capacity of the discharge receptacle, measured at the lead-in connections, should not amount to more than about 50% of that of the end state, or it should even be much lower. It is generally advisable to begin the starting process with a reduced electrode voltage as well as with a reduced gas pressure, but this is not absolutely necessary. In some instances, and in the case of special arrangements of electrodes or processes, the gas pressure may also be the same at the beginning as at the later end state, and only the electrode voltage be reduced, or the electrode voltage corresponding to the end state be applied already in the starting phase and the gas pressure be correspondingly reduced. On completion of the starting process, if the process has been correctly planned in accordance with the above-mentioned rules, the temperature and constitution of the surfaces participating in the process are such as to ensure stable, continuous operation. If desired, the discharge receptacle may now be put out of operation even for short periods of time, for instance a few minutes, and then immediately put into operation again with the full power. The end state that is reached is characterized by the fact that the condition of the gas enables a powerful glow discharge to take place only in the immediate proximity of the surfaces participating in the process and the thickness of the cathode drop space is always much smaller than the spatial distance between the surfaces participating in the process and the next counter-electrode. The thin gas layer corresponding approximately to the thickness of the cathode drop space, and the confining surfaces play the main part in the energy transformation; this is true of all gases that may be used. Naturally, the thickness of the effective layer of gas is also determined by the composition of the gaseous atmosphere and the gas pressure. The gas consumption involved in a process wherein gases react together as well as in the case of most applications for metallurgical processes, has to be compensated by a continuous supply of gas to the internal space, under the prescribed gas pressure which has to be maintained.

By following the rules described above and by means of the strating process, it is possible, for instance, to treat workpieces in which surfaces up to 25,000 sq. cm. and more, participate in the process. For instance, the behavior of such a glow discharge with an energy transformation of 17,000 watts in the end state is shown by the curve A of the current/voltage characteristic according to FIGURE 4. As already mentioned, the end state of the discharge can be interrupted for a short time without any detriment, so that it is possible to obtain such a characteristic. The curve A was ascertained in connection with a workpiece having a total surface of $F=4,000$ sq. cm. participating in the process, at a pressure of $P=5.7$ mm. Hg and a temperature of $T=505°$ C. of the relevant surfaces in the stationary end condition. If the terminal voltage U is continuously increased up to the value B, a complete covering of the glow of the parts to which a voltage is applied, is obtained, and with further increase of from U there is obtained an increase in the specific output of the glow discharge, mainly only on the desired surfaces. Here, the function $I=f(U)$ does not indicate any of the usual instability like the characteristics 65 of normal glow discharges shown in FIG. 15 (beyond a current of 0.5 to 1 amp) and thus reveals an entirely different behavior from that of the glow discharges hitherto known. The specific output is about 4.2 watts per sq. cm. surface for a current of $I=30$ amps which has to be maintained during continuous operation. This, of course, is only the specific output for the surfaces of $F=4,000$ sq. cm. participating in the process; it is less on all the other parts to which a voltage is applied, more particularly at the lead-in connectors.

The characteristic C represented in FIG. 4 relates to the treatment of a workpiece with a specific output of 5.3 watts per sq. cm. on the surfaces participating in the process, at a higher gas pressure of $P=10.5$ mm. Hg. In the characteristic, there appears at the value D of the electrode voltage U a slight indication of the point of instability which is strongly defined in the usual glow discharges. In both examples, this specific output is reduced during continuous operation to a desirable middle value by the lowering cycle to be hereinafter described.

The fact that the glow discharge according to the present invention is a new kind of glow discharge is evident from the comparison of the well known current/voltage characteristic 65–67 of FIG. 15 with the characteristic 66 which is identical with curve A of FIG. 4, but is plotted in the same coordinates as the characteristic 65–67. To prove the different behavior of the two kinds of glow dicharges shown in FIG. 15 it is sufficient to calculate the inherent impedance or resistance $R_i$ of the discharge.

The current/voltage characteristic 65–67 of FIG. 15 which is considered to be characteristic for the well known low-intensity glow discharges, was evaluated for eight different points for the current I between .2 and 1.0 amperes, as per the following table:

*Evaluation of the curve 65–67, FIG. 1*

| I Amp. | U Volts | $R_i$ U/I Ohms | N Watts | $dR_i$ | $R_i/R_o \cdot 100\%$ |
|---|---|---|---|---|---|
| 0.2 | 500 | 2,500 | 100 |  | 100 |
|  |  |  |  | +830 |  |
| 0.3 | 1,000 | 3,330 | 300 |  | 133 |
|  |  |  |  | +1,670 |  |
| 0.4 | 2,000 | 5,000 | 800 |  | 200 |
|  |  |  |  | +1,680 |  |
| 0.45 | 3,000 | 6,680 | 1,350 |  | 567 |
|  |  |  |  | +1,720 |  |
| 0.5 | 4,200 | 8,400 | 2,100 |  | 336 |
|  |  |  |  | +2,100 |  |
| 0.57 | 6,000 | 10,500 | 3,420 |  | 420 |
|  |  |  |  | −2,000 |  |
| 0.7 | 6,000 | 8,500 | 4,200 |  | 340 |
|  |  |  |  | −1,950 |  |
| 1.0 | 50 | 50 | 50 |  | 2 |

For each of the eight positions, the internal resistance $R_i=U/I$ and the power N was calculated. In addition, the charge in resistance $dR_i$ between the individual points was determined and, moreover, the resistance ratio $R_i/R_o$ in percent, the reference value being the resistance $R_o=2,500$ ohms at a current $I=.2$ amps. Correspondingly, the two characteristic curves A and C in FIG. 4 were evaluated in accordance with the table below:

*Evaluation of the curves A and C, FIG. 2*

| I Amp. | I Volts | $R_i$ Ohms | N Watts | $dR_i$ | $R_i/R_o \cdot 100\%$ |
|---|---|---|---|---|---|
| 0.4 | 150 | 375 | 60 |  | 100 |
|  |  |  |  | −209 |  |
| 1.2 | 200 | 166 | 240 |  | 44 |
|  |  |  |  | −91 |  |
| 4.0 | 300 | 75 | 1,200 |  | 20 |
|  |  |  |  | −35 |  |
| 10 | 400 | 40 | 4,000 |  | 10.7 |
|  |  |  |  | −15 |  |
| 20 | 500 | 25 | 10,000 |  | 6.7 |
|  |  |  |  | −6.4 |  |
| 30 | 560 | 18.6 | 16,800 |  | 5.0 |
| 0.4 | 300 | 750 | 120 |  | 100% |
|  |  |  |  | −350 |  |
| 1.0 | 350 | 350 | 350 |  | 46.6 |
|  |  |  |  | −190 |  |
| 2.5 | 400 | 160 | 1,000 |  | 22.3 |
|  |  |  |  | −48 |  |
| 4.0 | 450 | 112 | 1,800 |  | 15 |
|  |  |  |  | −41 |  |
| 7.0 | 500 | 71 | 3,500 |  | 9.5 |

The reference resistance $R_o$ was taken as the value $R_i$ at a current of $I=.4$ amps., i.e. $R_o=375$ ohms for curve A and $R_o=750$ ohms for curve C.

If the shape of the inherent discharge resistance $R_i$ of the three characteristics is plotted in dependance of the discharge current I, the curves according to FIG. 16 are obtained, wherein:

Curve 1 indicates the inherent resistance $R_i$ for the hitherto known glow discharge according to the characteristic 65–67 in FIG. 15;

Curve 2 indicates the inherent resistance $R_i$ for the characteristic A according to FIG. 4, i.e. for an area of 4,000 sq. cm. at a gas pressure of 5.7 mm. Hg;

Curve 3 indicates the inherent resistance $R_i$ for the characteristic C according to FIG. 4, i.e. for an area of 650 sq. cm. and a gas pressure of 10.5 mm. Hg.

FIG. 16 shows that the inherent resistance $R_i$ for the known glow discharge displays values between 2,500 and about 10,000 ohms. On the other hand, the curves 2 and 3 relating to the high-current glow discharge at an operating point according to the present invention reveal values of the inherent discharge resistance no higher than about 400 to 700 ohms. The difference in the magnitude of the inherent resistance $R_i$ of the two types of discharge may easily reside in the fact that the current/voltage characteristic 65–67 in FIG. 15 was determined in a discharge chamber having relatively small electrode surfaces, the shape of the cuves in FIG. 16, however, shows that the inherent resistance at the usuable range of low-intensity discharges increases with increasing discharge current and voltage, while it decreases with increasing discharge current and voltage in the case of high-current glow discharges.

The values obtained from the above tables in respect of the inherent resistance $R_i$ are shown in kw. in FIG. 17 plotted against the power N supplied. As in FIG. 16, the curve 1 in the figure corresponds to the low-intensity glow discharge, while the curves 2 and 3 indicate the behavior of the high-current glow discharge. It may be seen that relatively high power up to about 4 kw. can be obtained also in a hitherto known glow discharge according to the curve 65–67 in FIG. 15, i.e. a power as employed in the processing of a work having 650 sq. cm. according to the characteristic C in FIG. 4. Again, it is clearly visible that the inherent resistance $R_i$ in low-intensity glow discharges increases along with the increasing power employed in the discharge chamber, while it becomes smaller with high current glow discharges at increasing power consumption.

The fact that the curve 1 of the hitherto known low-intensity glow discharges shows an increase in FIGS. 16 and 17 while the curves 2 and 3 for the new high-current glow discharges decline comparatively steeply, cannot be explained by the possibility that the characteristic 65–67 in FIG. 15 was obtained with much smaller electrode surfaces than the curves A and C according to FIG. 4 compared with it. If the resistance of a discharge chamber increases when the current or the power consumed increases, this tendency may not be altered even by parallel arrangement of a plurality of similar discharge chambers; accordingly, the same tendency must apply to larger electrode surfaces; the behavior of the inherent resistance $R_i$ in dependence of the discharge current and, respectively, of the power consumed can therefore hardly be determined by the electrode surfaces used.

In order to make still clearer the different behavior of the inherent resistance $R_i$ with low-intensity and high-current glow discharges, FIG. 18 shows the percentage change of the resistance $R_i$ in dependence on the discharge current I and, respectively, of the power N consumed, the reference point (100%) for the low-intensity glow discharges (curves 1) being selected as the resistance value $R_o$ with a current of .2 ampere, and the value of $R_o$ with a current of .4 ampere for high-current glow discharges (curves 2 and 3). The full-line curves in FIG. 18 show the percentage change of the resistance in dependence on the discharge current I and it can clearly be seen that with the known low-intensity glow discharges according to curve 1 the inherent resistance will rise from 100% to 450% when the current increases, while it drops from 100% to 5–10% with rising current in the case of high-current glow discharges.

A similar picture is presented by the curves in FIG. 18 shown in broken lines, which represent the percentage change of the inherent resistance $R_i$ in dependence on the power consumed in kw. With an increase of the power consumed of about .1 kw. to 4 kw., the inherent resistance will rise from 100% to about 450% with low-intensity glow discharges, while the discharge gap resistance in high-current glow discharges drops from about 100% to about 10%.

Particular mention is made of the fact that the associated curves 2 and 3 showing the behavior of the inherent resistance with high-current glow discharges are very close in FIG. 18 although an electrode surface was employed for the curve 2 of over ten times the size as for the curve 3, while the gas pressure relative to curve 3 was twice as high as that used for curve 2. It is thus obvious that the percentage change of the inherent resistance in dependence on the discharge current and, respectively, on the power consumed, is only slightly dependent on the electrode surface in high-current glow discharges.

In view of the above results of calculation, it has been proved that at least at currents beyond 1 amp. there exists a fundamental difference in the behavior of the inherent resistance between hitherto known low-intensity glow discharges and the high-current low-voltage glow discharges according to the present invention.

The rules for approaching an operation point showing the behavior of the above described new kind of glow discharge comprise the steps regulating operating voltage and the gas pressure in the discharge chamber first to values sufficient to produce a discharge of less current strength and lower energy density than at the said operating point, regulating then both voltage and pressure to higher values thereby altering the ratio voltage/current, i.e. the inherent resistance of the discharge chamber and proceed this raising to a current beyond 1 amp. and to an operating point in the environs of which the inherent resistance decreases with increasing current and voltage. The inherent resistance or impedance of the discharge being always less than 1000 ohms. The voltage preferably is not higher than 1500 volts.

It is pointed out that regulating of voltage or pressure or both can be carried out in a step by step manner or, if desired, in such small steps that a more or less continuous increasing is obtained.

The method according to the invention is, if the electrodes in the discharge vessel are appropriately arranged, suitable for carrying out manifold metallurgical processes and more particularly for treating surfaces of metal workpieces, for instance for nitriding steel surfaces. It is possible to treat even very complicated surfaces provided with recesses and holes and, if desired, to obtain the same specific output at all the points of the energy favored surfaces. Naturally, for other reasons, a continuous characteristic according to FIGURE 4 cannot be expected. For instance, it is possible to attain a division of output such that the inner walls of steel tubes with a diameter of between 0.5 and 2 cm. are energy-favored, it being then possible to obtain specific outputs of 0.5 to 6 watts per sq. cm. surface, with an electrode voltage of the order of 400 to 600 volts and a gas pressure of 2 to 15 mm. Hg. Also in the case of holes of larger diameter, of 2 to 10 cm., corresponding processes can be carried out on the inner walls by using approximately the same electrical data. The gas pressure to be used is always lower in the case of bores of smaller diameters and higher in the case of larger diameters. In the case of bores having a length smaller than about 80 times the diameter, it is possible, by a suitable choice of electrode voltage and gas pressure, to make the powerful glow discharge, according to the division of the output, cover the whole inner wall of the bore in a largely uniform manner. On the other hand, when the ratio of the diameter to the length of the bore is greater than 1:80, it is preferable to provide, for instance, a wire-like auxiliary electrode along the axis of the bore. According to the type of process carried out, this axial counter-electrode may constitute the anode if direct current voltage is used for the supply of the discharge receptacle and no glow discharge is shown on the surface acting as an additional supply of energy, or if an alternating current is used, its surface participates in the process, which, owing to its small extension causes strong heating and secondary processes, which may be desired, as for instance evaporation of the wire and deposition upon the inner wall of the bore (diffusion of chromium, tungsten, etc.).

When metallurgical processes have to be carried out on the surfaces of workpieces, a very definite temperature has generally to be maintained within narrow tolerances as regards the surfaces participating in the process. On the other hand, to carry out the desired reaction effectively, it is frequently necessary to get as high as possible a specific output at the corresponding surfaces. However, since the surface temperature depends upon the dispersal of the heat, which varies according to the workpieces, it cannot be expected that the high transformation of energy, desired because of the reaction, should correspond to the supply of energy required in order to maintain a definite surface temperature. This applies especially to the treatment of the inner wall of tubes, since in this case, although the inner and outer wall may be surfaces participating in the process, viz. may serve as an energy supply, the inner wall contributes but very little to the supply of heat. This difficulty is avoided according to the invention by the fact that the electrode voltage is reduced from the nominal value of the end state of the discharge, for a short period of time, to a lower value and this drop is repeated in a predetermined time cycle. Here, however, at least during the interval with normal voltage, the division of the output is maintained.

Figure 5:
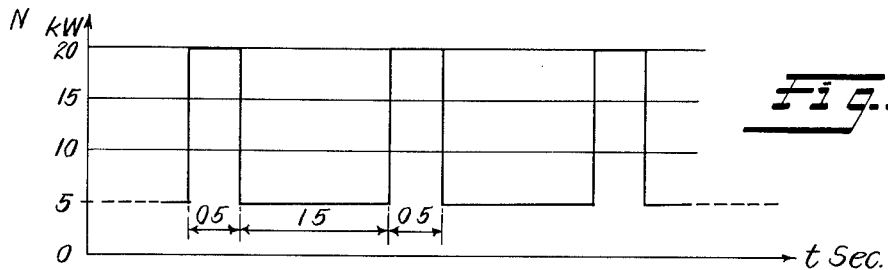
FIG. 5 is a diagram showing the lowering of the cycle.

For instance, as regards the same process, the starting of which is represented in FIGURE 3, FIGURE 5 shows the lowering cycle of the electrode voltage, and the output N in dependence upon the time $t$, a working interval of 0.5 second following a lowering interval of 1.5 seconds. By a suitable choice of the remaining energy transformation during the lowering interval and by changing the ratio between working and lowering intervals, a suitable temperoral middle value of the energy transformation may be adjusted so as to maintain a predetermined surface temperature, in this case for instance 1.5 watts per sq. cm., and in spite of the high specific output required for carrying out the desired process, taking into consideration the heat balance, can be maintained during the working intervals. The cyclic drop in the output has proved advantageous, especially in the metallurgical treatment of bores. In this case, the cyclic output drop has additionally a valuable secondary effect, namely the gas pressure, too, changes in the bore with the fluctuations in the output, which results in a gas exchange in the bore, if the working and lowering intervals are suitably chosen. However, such a gas exchange is required, in order to prevent the gas volume within the bore from being impoverished of substances which are consumed in the respective process.

The method according to the invention can be used with advantage for a division of output in favor of large surfaces of individual workpieces, as well as for simultaneous energy-favoring of small surfaces on a number of workpieces and, by the proper arrangement of the individual workpiece, if desired, by using auxiliary electrodes, it is possible to limit the powerful glow discharge to the surfaces of the individual workpieces participating in the process. When the discharge receptacle has applied to it a voltage of constant polarity, all the workpieces are connected as a cathode. When a supply of alternating current-voltage is used, the workpieces with the surfaces to be favored may be connected in groups and be connected to the individual phases of the source of alternating current, thus, for instance, in three groups when the supply is effected by means of a three phase alternating current voltage; preferably, the individual workpiece surfaces may in this case be so connected that adjacent pieces lie on different phases.

Of course, the method of dividing output according to the invention is in no way limited to the carrying out of metallurgical processes, but may be also used with advantage for producing chemical reactions. In particular, the gas layer, which is in the immediate proximity of the surfaces participating in the process and is especially effective because of the presence of ionized and atomic constituents of the gaseous atmosphere can be favored thereby with respect to the division of energy. Such constituents co-operate very actively in the reactions for carrying out processes between gases, as well as between gases and solid or liquid substances, and are produced in increased quantities as a result of the division of output. Furthermore, the high kinetic energy of the gas particles in this layer is used for instance for heating solid substances in order to produce reactions with the gaseous atmosphere. In connection with such chemical processes it should be noted, that the objects to be treated always must conduct the electric current but can show a non-metallic nature. For example, the oxide of aluminum is non-metallic but is a conductor at elevated temperatures, such as 1000° C. Also semi-conductor material can be treated according to the invention.

However, the energy favoring of the surfaces participating in the process themselves can also be advantageous for the chemical influencing of said surfaces. For instance, it is possible to reduce ores in a hydrogen atmosphere, the division of output in the process being controlled by the above-mentioned rules, so that it is possible to master it to a great extent, as regards both the speed of reaction and the temperature that occurs, even when large amounts of gaseous reaction products are produced and have to be led away. In the treatment of oxide ores as an energy-favored surface in a hydrogen atmosphere the reduction produces water vapors in addition to oxygen, and according to the kind of admixtures used also other gaseous substances, even during the starting process. After the end state is reached, the reaction is completed and, if desired, the end product may be melted by further dividing the output while increasing the electrical energy transformation. According to the kind of substances to be treated, the energy favoring is effected in a solid condition thereof, or, if desired and advantageous, only after said substances have been melted, e.g. for the purpose of reducing or oxidizing them. Moreover, other physical or chemical processes, such as diffusion processes, spraying of electrode surfaces, producing and using catalytic actions of finely divided substances, hydrations, etc. may be carried out by a division of output in favor of the surfaces participating in the processes, possibly utilizing the large kinetic energy of the gas particles in the gas layer adjacent to these surfaces.

In all such chemical and chemico-physical processes, the same rules come into consideration with regard to the connection of the surfaces to be favored with respect to the energy, as in the case of the treatment of workpieces above mentioned. Accordingly, these surfaces, that is to say, the substances to be treated, are connected to the cathode in the case of a direct current supply, whilst in the case of an alternating current supply, such a reaction surface is supplied by a phase thereof. The division of the output of the powerful glow discharge in favor of the surfaces participating in the process can thereby be attained in the same way as described with respect to the treatment of workpieces.

Figure 6:
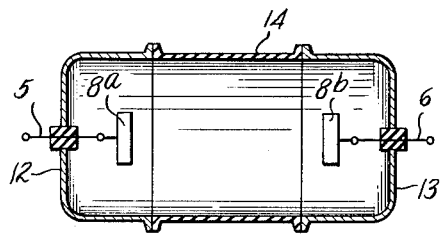
FIG. 6 is a diagrammatic representation of a further discharge receptacle.

The apparatus for carrying out the process according to the invention preferably consists at least partly and especially at the electrode lead-in connections, of a vessel with electrically conducting walls, for instance, as is diagrammatically illustrated in FIGURES 1 and 2. However, the invention is not limited thereto. For instance, FIGURE 6 shows a receptacle construction in which the two attachable ends 12 and 13 are of electrically conducting material, but separated from each other by a cylindrical intermediate member 14 of insulating material. The lead-ins 5 and 6 are provided in the ends 12 and 13 respectively. The shape of the receptacle can, of course, be adapted to a large extent to the shape of the article to be treated. It appears easy to avoid difficulties that may arise by using walls of insulating material in the proximity of the lead-in connections. However, this is not possible in practice since insulating inner walls become very quickly electrically conductive during operation (spraying etc.).

Figure 7:
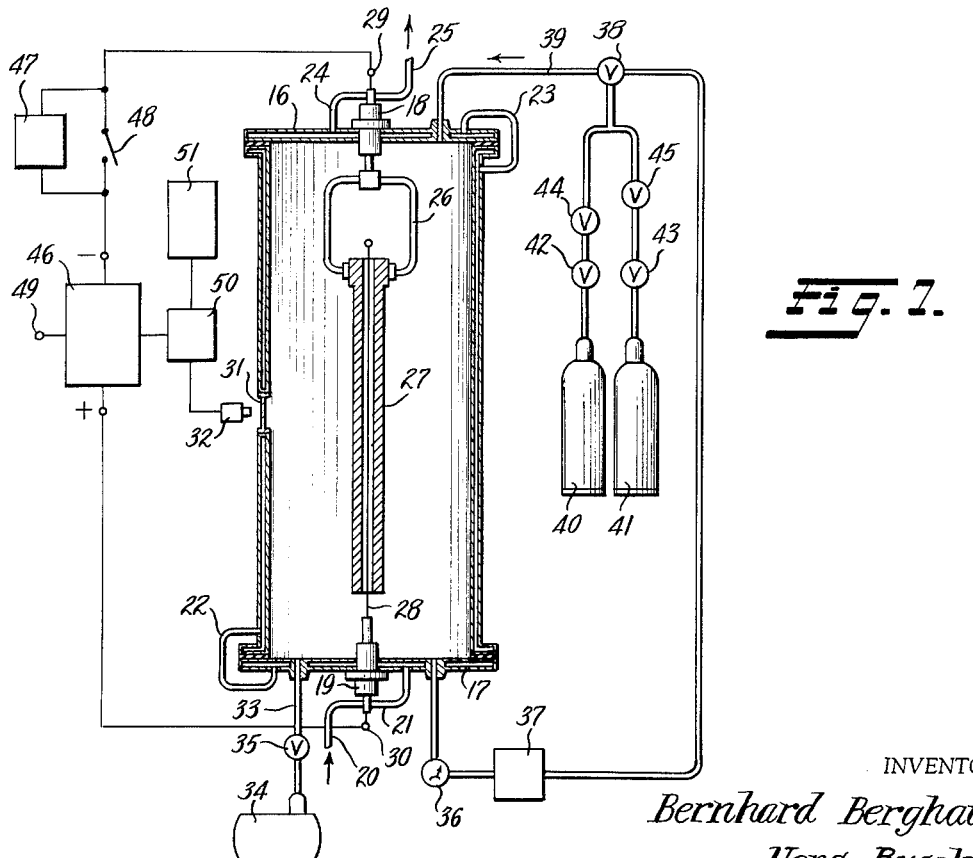
FIG. 7 is a diagrammatic illustration on an installation and discharge receptacle for the treatment of steel tubes.

One embodiment, given by way of example, of a discharge receptacle and controlling means for carrying out a tempering process, wherein the inner wall of a steel tube is favored in respect of energy, is shown diagrammatically in FIGURE 7. The discharge receptacle consists of an elongated cylindrical chamber 15 closed in a gas-tight manner by means of an upper and lower cover 16 and 17 respectively. The walls of the chamber 15 and the two covers 16 and 17 are double-walled in order to allow for a flow of cooling water. Lead-in connections 18 and 19 project into the inner space through the two covers 16 and 17 respectively. These lead-in connections 18 and 19 are also water cooled and the cooling water for the whole of the discharge receptacle is supplied from the pipe 20, through the lead-in connection 19, the pipe 21 to the double-walled cover 17, through the latter and the pipe 22 from below, into the cooling jacket of the chamber 15, and leaves the same at the top through the pipe 23, flows through the pipe 23, flows through the double-walled cover 16 and through the pipe 24 to the lead-in connection 18 and therefrom to the discharge pipe 25. In the interior of the discharge receptacle there is, for instance, suspended at the upper lead-in connection 18, through the stirrup 26, a steel tube 27, the walls of which, particularly the inner wall, are the surfaces participating in the process. Since the bore of the tube 27 to be treated has to have a length greater than 80 times its diameter, there is provided a thin rod 28 acting as a counter-electrode, the same being secured to the lower lead-in connection 19 and projecting freely out of the bore along the axis of the tube, or it may be supported at its upper end by means of a further lead-in connection, on the receptacle wall. In this way, the tube 27 is connected as one electrode to the connection 29 and the rod 28 is connected to the connection 30 as the other electrode. The temperature measurement of the workpiece 27 is effected through an inspection window 31 by means of a radiation pyrometer 32.

The interior of the discharge receptacle may be evacuated to the required extent through the gas suction pipe 33 and the valve 35, by means of a suitable pump arrangement 34. A low-pressure gauge 36 is provided to indicate the gas pressure, and it so controls the gas inlet valve 38 through the device 37 that the predetermined gas pressure is maintained in the interior of the chamber 15. The composition of the gaseous atmosphere in the interior of the discharge receptacle may be controlled by the supply of gas through the pipe 39, which is fed, through the valve 38 controlling the admitted amount, for instance from two gas cylinders 40 and 41, through the pressure reducing valves 42 and 43 and the stop valves 44 and 45 respectively. The shown installation comprising two gas cylinders 40 and 41 is adapted for instance, for the use of an inert gas, for example krypton, and the admixture of another gas, for instance, nitrogen for the gaseous atmosphere in the discharge receptacle.

The electrode treminals 29 and 30 are connected to the negative and positive poles of a source of direct current 46 respectively, and a series impedance 47 is inserted in the lead to the connection 29, which impedance can be short-circuited by a switch 48. The source of direct current 46 is in this case, for instance, a rectifier which is supplied at the connection 49 with a single-phase alternating current, and can be controlled by a regulating device 50 with regard to the voltage that is applied. The regulating device 50 is actuated, on the one hand, by a predictor 51 and, on the other hand, by the measured voltage which is proportional to the temperature indicated by the pyrometer 32. The source of direct current 46 may be such that the positive as well as the negative poles are not connected to earth, and that the discharge receptacle itself is earthed or the positive connection 30 together with the discharge vessel may be earthed.

During the starting process the discharge receptacle is preferably hand-controlled. In this case, the switch 48 is open so that the impedance 47 lies in the electrode circuit to limit the current of the glow discharge. The control device 37 for obtaining the desired gas pressure may also be hand-controlled.

To approach the desired operating point at the discharge characteristic, the gas pressure at the beginning was about 2.5 mm. Hg and the discharge operated with a voltage of about 350 volts D.C. producing a current of about 7 amps. After a time interval of 10 minutes the pressure was increased to 4.5 mm. Hg and the discharge operated with 420 volts and 12 amps. during a time interval of one-half hour. The inherent resistance or impedance of the discharge chamber decreased between the two operating points from about 50 ohms to about 35 ohms. The temperature of the gun barrel was at the end of the second interval about 480° C. In the described example a nitriding of the inner wall of the barrel 27 was to be carried out at a temperature of 505° C. so that the energy density had to be further increased. The gas pressure was therefore raised to 5.7 mm. Hg and the voltage increased during a time interval of 30 minutes step by step to 465 volts and an operating point with the desired temperature reached at a current of about 15 amps. or a power consumption of about 7 kw. The mean value of the energy density was about 1.75 watts per sq. cm. corresponding to an area of the outside and inside surface of the gun barrel of about 4000 sq. cm.; the effective energy density was higher on the inside surface and lower at the outside surface. The characteristic of the discharge chamber is shown as curve A in FIG. 4. Also in the environs of the operating point characterizing the end state of the approaching process the inherent resistance or impedance showed a decrease with increasing current and voltage.

When the starting process is completed, the series impedance 47 is short-circuited and the electrode voltage is automatically maintained at such a value that it will ensure the predetermined temperature of the surfaces participating in the process, for which purpose the temperature measuring device 32 correspondingly controls the regulating device 50. At the same time the predictor 51 effects the lowering cycle of the electrode voltage through the same regulating device 50 (see for instance FIGURE 5).

As found by experience, the carrying out of technical processes of this kind in a reliable manner by dividing the output of the powerful glow discharge requires special measures as regards the insulated lead-in connections 18 and 19, in order to avoid the accumulation of deposits of materials and the detrimental effects of glow phenomena, which still occur, despite relieving, on the insulating parts. An embodiment of such an insulated lead-in connection is shown, by way of example, in axial section in FIGURE 8, the same being incorporated in the double-walled upper cover 16. The middle conductor 52 with the fixing bolt 52a projecting into the interior of the receptacle and supporting the holder of the workpiece 26 (FIGURE 7) is so arranged as to allow for water cooling, the water entering the pipe 23 and flowing out through the pipe 24. The middle conductor 52 is insulated from the cover 16 by means of the insulating members 53 and 54, which are pressed by means of the screw cap 55 against the corresponding abutting surfaces of the cover 16, ensuring on the one hand, a gas-tight closure, and one the other hand, enabling the whole of the lead-in connection to be easily dismounted. The middle conductor 52 is surrounded by a metal sleeve 56 at the end directed towards the interior of the receptacle, which sleeve is partly screened by a metal cap 57 secured to the inner wall of the cover 16. The gap system shown in FIGURE 8 prevents a powerful glow discharge and thereby increases the maximum admissible impact of the discharge on the lead-in connection. The gap system consists of the annular gap 58 between the (grounded) cap 57 and the sleeve 56 to which a voltage is applied, the main gap 59 between the (grounded) wall 16 and the sleeve 56, the transverse gap 60 between the sleeve 56 and the insulator 54, and the annular gap 61 between the insulating member 54 and the (grounded) wall 16. By preventing a powerful glow discharge by suitably dimensioning the gap system and the water cooling, such a lead-in connection can be used with perfect safety as regards the discharge impacts, which can hardly be avoided in technical processes in spite of the energy relieving.

The division of output and the energy favoring of certain desired surfaces in a powerful glow discharge was clearly demonstrated in an arrangement including a molybdenum tube which was brought to annealing temperature by the glow discharge. The molybdenum tube, about 8 mm. in diameter and 50 mm. long, formed one electrode, while the other electrode was a metal bolt located about 40 mm. away from the said molybdenum tube. This discharge distance was operated with an alternating current of 700 volts and 50 cycles between the two electrodes in a hydrogen atmosphere having a pressure of 9 mm. Hg. The molybdenum tube revealed in continuous operation a temperature of approximately 2000° C. and had on its outer surface an energy density of some 50 watts per sq. cm. It could be clearly seen that the output of the glow discharge was largely concentrated on the molybdenum tube, for the latter's supporting wires—despite the heat conduction from the incandescent tube—were no longer incandescent a short distance away from the molybdenum tube. It was also possible to observe a distinct division of output in favor of the molybdenum tube on the counter-electrode which, despite the powerful radiation heating from the white-hot molybdenum tube, emitted only a feeble glow—and even that was right at its front end.

In this example of a division of output in an electric glow discharge the conditions were, of course, already extreme as a result of the powerful total emission current which amounts to approximately 4 milliamps per sq. cm. However, there was no change into an arc discharge, nor were there any noticeable amounts of energy transformed on the other surfaces not participating in the annealing process. It would have been quite possible, if the pressure were increased, to raise the temperature to approximately 2700° and thus to melt the molybdenum tube.

In the above example the geometrical arrangement of the electrodes was in accordance with the above-mentioned rules. The distance of 40 mm. between the electrodes was relatively small in comparison with the internal and external surfaces which were favored in respect to the energy and have an area together of some 2800 sq. mm. On the other hand, the distance from the leading-in insulators was very much greater, as is the distance from the receptacle walls. The sum of all the surfaces which were not energy-favored but carried voltage, that is to say, the supporting wires and the bolt of the counter-electrode, was likewise substantially smaller than the energy-favored surface of the molybdenum tube.

The possibility of a division of output in glow discharges at the electrodes in a vessel having a reduced pressure, such that certain electrode portions are preferred while other portions carrying the same voltage are largely free from glow discharges, appears most unusual in the light of generally known physical principles. It must be considered that these are glow discharges having an energy transformation of over 1 kw., which is a type of operation in which, with the conventional insulating discharge vessels of small dimensions, the range of "normal" glow discharges should long have been exceeded and the complete coverage of all cathode surfaces expected with certainty. Prior to this invention it was considered certain that an increase in power increased the range characteristic of "abnormal" discharges would be reached. Accordingly it could not be expected that with the energy transformation in the glow-discharge partial coverage of the energized electrodes could be obtained in a predetermined manner.

As explained above, the high energy transformation required in large-scale glow-discharge processes for the heating of the material to be treated and of the surfaces participating in the process, involves a relatively high specific density of energy of usually above .3 watt/cm.$^2$ at said surfaces. In order to avoid the necessity of raising the operating voltage to unpractically high values above 1000 volts, the only possibility is to increase gas pressure in the discharge vessel above 1 mm. mercury.

If, for instance in the metal discharge vessel 101 which is diagrammatically reproduced in FIG. 9 and has two insulated current lead-ins 102 and 103, a holder 104 for the tube 105 whose surface is to be treated, and a counter electrode 106, an operating voltage of some 600 volts is applied at about 1 mm. Hg via the voltage source 107, a glow discharge is produced which covers all the cathodic structural members, viz. the workpiece 105, the holder 104 and the internal lead 108 of the current lead-in 102. Naturally the density of energy at the workpiece 105 is still relatively small with this mode of operation and is sufficient at most to heat said workpiece to 100 to 200° C.

If a density of energy of e.g. 1.5 watt/cm.$^2$ and a temperature of 500° C. of the workpiece is to be obtained and maintained for an extended period, the voltage must be correspondingly increased. Naturally this causes the density of energy at all cathodic parts, also at the internal lead 108 of the current lead-in 2, to be increased, which is most undesirable since the sealing means at such heavily loaded lead-ins must usually be protected against elevated temperatures.

In the attempt to keep the high-energy glow discharge away from the current lead-ins as far as possible, it was tried substantially to increase the height of the discharge vessel 101 while retaining the arrangement of parts 103 through 106 and to connect the holder 104, by means of a thin rod, with the internal lead 108 of the current lead-in 102, which was then substantially remote. Examination of such experimental arrangements revealed the astonishing fact that the long rod connection was only partially covered with glow discharges while its top portion including the current lead-in 102 was entirely free therefrom. The only partial coverage of very elongated electrodes with glow discharge proved to depend on pressure, and increases in pressure over and above 1 mm. mercury achieved an increasing concentration of the glow discharge on the tube 105 and the immediately adjacent space. However, this is by no means the effect known in glow-discharge tubes of small dimensions where the electrodes are partially covered in the so-called stabilization range of the current/voltage characteristic. In the hitherto unknown effect of partial glow-discharge coverage of very extensive electrode arrangements, no corresponding characteristic was found, as already described in conjunction with FIGS. 4 and 5.

This new knowledge supplies a rule, which was practically tested on many different electrode arrangements, for the efficient regulation of the discharge condition in such a manner that a division of output is achieved in favor of the surfaces associated with the process while predetermined current carrying structural members, particularly the current lead-ins are at least partially relieved. To this end, it is necessary to work with a gas pressure above a specific limiting pressure determined by the electrode arrangement, and to set the voltage at the value required to achieve the desired density of energy or temperature, but in no event to exceed a specific limiting voltage. In this way a state of discharge is created in which the glow discharge just begins to withdraw from the current lead-in. The material to be treated, i.e. tube 105 in FIGS. 9 and 10, then shows the desired specific density of energy while at least the internal lead 108 of the lead-in 102 is relieved of energy. If desire, relief may also be extended to the holder 104. In operation, therefore, a gas pressure above the limiting gas pressure and a voltage below the limiting voltage will preferably be set.

While according to the said rule a division of output is obtainable in all cases, precautions must be taken to produce the relief and concentration of energy respectively exclusively at the locations desired. As investigations have revealed, the configuration of the current carrying members termed "electrode geometry" determines the location where discharge is favored, where the concentration is obtained. The determining factor for the desired relief of the current lead-in 102 in FIGS. 9 and 10 is, by the way of example, the arrangement and area of the counterelectrodes 106 associated with the tube 105 in comparison with the distance and areas at the point of entry of the internal lead 108 of the current lead-in 102 into the reduced pressure chamber as compared to the adjacent metal parts connected to the positive pole of the voltage source 107. This electrode geometry must be selected in such a manner that the capacity between tube 105—without holder 104—and the members of the counterelectrode 106 extending along its length is larger than the entire parallel capacity of both the other structural members situated in the reduced pressure chamber connected with tube 105 (parts 104 and 108) and the structural members at the potential of the counterelectrodes 106 (bottom bend of 106 and internal lead of 103). This parallel capacity is here determined by the series capacities between the housing 101 and the holder 104 together with the internal lead 108 on the one hand, and the capacities between the housing 101 and the counterelectrodes 106 together with the internal lead of the lead-in 102 on the other. If the capacity value between the tube 105 and the counterelectrodes 106 exceeds that parallel capacity, the desired division of output, in which the lead-in 102 and the internal lead 108 are relieved and energy transformation is concentrated on the process surfaces, i.e. tube 105, is obtained with simultaneous alteration of pressure and voltage and maintenance of the prescribed density of energy.

This capacity rule enables a suitable arrangement of electrodes to be found easily, which in turn renders possible a division of output in favor of the surfaces involved in the process. Naturally, this is only an abridged description of the geometric configuration of distances and areas and it is not implied that these capacities are actually operative as capacitive imaginary components when the glow discharge is achieved. Actually, the impedance values of the individual portions of discharge spaces should probably be considered to be ohmic and to be resistances. This capacity conception, however, has proved useful as an aid in determining the efficiency of the structural arrangement.

If the capacity rule were not observed and the sum of parallel capacities were to exceed the capacity between the tube 105 and the counterelectrodes 106 in the discharge vessel and the arrangement according to FIGS.

9 and 10, a division of output would be obtainable but relief would take place at the surfaces involved in the process, i.e. on tube 105 instead of at the current lead-in as desired.

Figure 11:
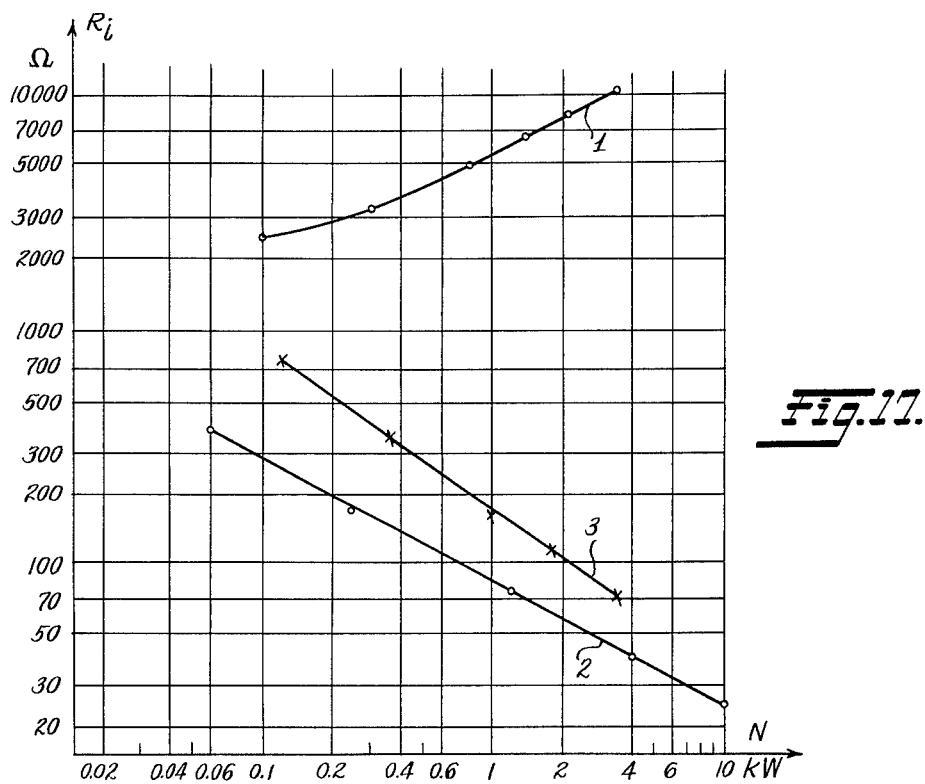

To decrease parallel capacity relative to process surface capacity, the metallic vessel 101 according to FIGS. 9 and 10 is grounded and not connected to the voltage supply circuit, which causes the capacities of the two internal leads of the current lead-ins to be series-connected against the housing 101. It is important, however, in this conception of capacity, that it is only the capacity of the internal lead 108 projecting freely into the underpressure chamber that is of importance, not the self-capacity concentrated within the current lead-in itself, because the control of the glow discharge is not determined by surfaces on which no glow discharge whatever can occur; the dielectric constant of the insulation, too, is immaterial. FIG. 11 shows an embodiment of such a current lead-in 102 in diagrammatic view, of which the internal lead 108 is insulated from the metallic vessel 101 by means of an insulator 109. In a known manner, insulator 109 is separated from the internal lead 108 by a narrow annular gap 110 and by a similar annular gap 112 from the metallic insulator sleeve 111. The point of entry of the internal lead 108 into the reduced pressure chamber here designated by the numeral 113 is where the internal lead 108 projects from the gap system of the current lead-in 102. The distance $a$ of this point of entry 113 of the internal lead 108 from the sleeve 111 is the determining factor for the capacity according to this specification, not the internal capacity in the current lead-in 102. In the current lead-in according to FIG. 12, the sleeve 114 for the insulator 109 is substantially closer to the point of entry 113 of the internal lead 108 so that the distance $a$ is considerably smaller and the capacity at this point substantially larger. With a view to perfect division of output within the meaning of the present invention, such a structure must be avoided.

Besides the measure designed to reduce the capacities parallel to the process surfaces set forth in conjunction with FIGS. 9 to 11, FIG. 13 shows that, as a further precaution, the discharge vessel can be subdivided into two half receptacles 116 and 117 which are insulated from each other and are similar to the arrangements shown in FIG. 6. The insulating ring 118 should ensure a minimum capacity C1 between the two halves 116 and 117 so that the parallel capacity comprising C2, C1 and C3 in series connection to the process surfaces of the workpiece 119 is as small as possible.

It may in some cases be desirable, as shown diagrammatically in FIG. 14, to provide a metallic discharge vessel 121 with covers formed of insulating material 122, 123 in order to reduce the capacity of the current lead-ins and to facilitate a concentration of the energy transformed on the material to be treated, by way of example a melt 124. The material to be treated may be of metallic or non-metallic nature.

It should finally be pointed out that insulated metallic screens arranged in the reduced pressure chamber can prevent undesirable large parallel capacities. By way of example, the outer metal holder 114 of the current lead-in according to FIG. 12 can be insulated from the discharge vessel 101 so that a screening effect is obtained. Also the internal lead projecting into the reduced pressure chamber and the holders for the material to be treated can, if necessary, be screened from the other metal parts. Such precautions may be of advantage particularly in conjunction with narrow metal receptacles and unfavorable capacity conditions on the process surfaces.

Concentration of the energy transformation in the division of output over the surfaces involved in the process can, except by reduction of the detrimental parallel capacity, be ensured by an increase in the capacity of the process surfaces against the associated counterelectrodes.

By way of example, in the glow-discharge treatment of the tube 105 in the discharge vessel 101 according to FIGS. 9 and 10, there is the possibility of using a counterelectrode having a large surface, such as the metal cylinder 125 shown in FIG. 11 instead of the three rod-type counterelectrodes at the distance $d$. An arrangement of the electrodes according to FIG. 13, too, causes the capacity between the workpiece 119 and the cup-type counterelectrode 120 to be increased.

The present methods of output division in a glow discharge on predetermined current-carrying structural members can be applied to all types of operating voltages. By way of example, FIG. 9 shows the supply by a direct-current source 107 via a series resistance 126, where periodic short-circuiting of the latter by means of a switch 127 controlled by the impulsing means 128 creates a pulse-type energy supply which is of advantage when large discharge intensities are desired while the mean energy value per unit time determining temperature must not be exceeded. Naturally, some other means for pulse-type control can be provided, by way of example a suitably controlled rectifier. Pure direct current, too, or rectified single or multi-phase alternating current may be employed. Moreover, the supply may be effected by alternating current, such as 50 cps., in impulse control being possible if necessary.

According to the present invention, the right selection of the so-called discharge path resistance in the gas surroundings of the different portions of voltage carrying at least intermittently negative parts is very important. Referring to FIG. 9 the resistance along the discharge path "$a$" from conductor 108 to the wall is greater than the analogue resistance between the object 105 to be treated and the counter-electrode 106 along the path "$d$". With a value of the discharge path resistance in the surroundings of the upper portion of the conductor 108, high enough with respect to the analogue resistance at all other parts connected to the same conductor 108, the energy density of the discharge on said portion can be reduced by a predetermined decreasing factor and if desired the said portion can be made substantially uncovered by the powerful glow discharge.

The decreasing of the energy density is very important, as above mentioned, at a junction between metallic parts and an insulator, for example the junction between the shoulder of the insulator plate 122 carrying the dish with the melt 124 in an apparatus according to FIG. 14. Such an unprotected junction is to be relieved with respect to the energy density at the object to be treated, the melt 124, by decreasing the discharge path resistance from the surroundings of the melt surface and the upper parts of the dish to the counter-electrode.

As already mentioned, the present measure, designed to relieve more particularly the cathodic lead-ins of energy, can be applied at the operating temperature of the process surfaces. It is, however, also possible, and advantageous in certain glow discharge processes, to set the limit values of gas pressure and voltage while the process surfaces are still cold, i.e. when their average temperature is between about 50 and 100° C., and then to maintain said values when the temperature rises. According to the discharge space resistance then occurring, a complete relief of the current lead-ins is achieved when the discharge has reached its end state, or else the initial state of relief is partly reversed again.

The "relief" of certain voltage carrying and at least intermittently cathodic structural members, in particular the current lead-ins, in accordance with the method described above, must of course on no account be carried so far in all cases that the energy transformation at these members is approximately nil. On the contrary, a relief in the ratio of 1:2 in favor of the process surfaces may already be of decisive advantage, depending on the design of the current lead-ins and the magnitudes of the energy transformation desired at the process surfaces. The degree of relief to be achieved can be simply ascertained by comparing the highest admissible specific glow discharge impact at the current lead-ins, in watts per square centimetre of surface under impact, with the prescribed specific energy transformation in watts per square centimetre of the process surfaces.

EXAMPLE 1

In an iron vessel 101 according to FIG. 9 having an inner diameter of 450 mm. and current lead-ins of which the internal lead had a distance of $a=70$ mm. from its point of entry to the housing cover, steel tubes 105 of 530 mm. length, an outer diameter of 40 mm. and a cylindrical bore of 7 mm. were treated. The three rods of 8 mm. diameter serving as counterelectrodes 106 were arranged at a radial distance $d=35$ mm. from the tube surface and ran parallel to the tube along its entire length. The distance from the tube surface to the inner wall of the vessel was $b=205$ mm., the total height of the interior of the vessel $c=1200$ mm.

The tube 105 was treated in a gesous atmosphere with a pressure of 11 mm. mercury and a content of 75 percent by volume of hydrogen and 25 percent by volume nitrogen. The steel of the tube contained 5 percent chromium, 1 percent molybdenum, .27 percent carbon and .4 percent manganese and had an initial hardness on the outside of 30±2 Rockwell C.

After a heating-up period of approximately two hours, treatment was effected with a voltage changing between 480 volts and 395 volts in pulses with a current of 6.7 amps. for the high voltage and 2.7 amps. for the low voltage. The high tension was effective during an interval of .3 second and followed by an interval of low tension lasting 1.4 seconds so that the so-called impulse ratio of impulse vs. pause was approximately 1:5. With this operation, the glow discharge was obtained at both the outside of the tube and in the bore, but the glow light coverage reached only the middle and the upper end of the holder 104 respectively of tube 105 so that the internal lead 108 of the cathodic current lead-in 102 was free from glow discharges. With this treatment, the tube reached an exterior temperature of 520° C. which was measured through a window in the wall of the vessel by means of a radiation pyrometer.

After an initial period of approximately 2 hours and a period of treatment under the above conditions of 27 hours, the voltage source was cut off and the tube left in the hydrogen-nitrogen atmosphere for another 5 hours, and removed after cooling. Along the entire outside, a very uniform hardness of 50 HRc±.5 HRc measured. Nitriding in ion bombardment achieved not only the increase in hardness desired by about 28 HRc, but also a substantially greater uniformity of the degree of hardness along the entire surface treated.

We claim:

1. In a process for establishing and maintaining a high current, low voltage glow discharge at a metal surface wherein said metal surface is positioned in a closed vessel containing a gaseous atmosphere having a pressure below atmospheric but equal to at least 1 mm. Hg, the constructional parts of said vessel including a lead-in to said metal surface which is insulated from the vessel wall, and an electrode, said metal surface and said electrode being connected with opposite poles of a source of electrical potential, and wherein a glow discharge is produced by an electric current between said electrode and said metal surface at a potential difference sufficient to cause a glow discharge without arcing; the steps of; arranging said metal surface in spaced relation to said constructional parts of said vessel so that the resistance to current flow in said atmosphere, when ionized, in the region of said metal surface, is less than the corresponding resistance in all other regions in said vessel; initiating glow discharge within said vessel to heat said metal surface to a temperature of at least 100° C., said glow discharge covering portions of said constructional parts which are negative relative to said electrode; and after heating said metal surface to said temperature, adjusting at least one of the factors of voltage and gas pressure to cause current flow to increase in the region of said metal surface and to diminish in other regions.

2. In a process for establishing and maintaining a high current, low voltage glow discharge at a metal surface wherein said metal surface is positioned in a closed vessel containing a gaseous atmosphere having a pressure below atmospheric but equal to at least 1 mm. Hg, the constructional parts of said vessel including a lead-in to said metal surface which is insulated from the vessel wall, and an electrode, said metal surface and said electrode being connected with opposite poles of a source of electrical potential, and wherein a glow discharge is produced by an electric currrent between said electrode and said metal surface at a potential difference sufficient to cause a glow discharge without arcing; the steps of; arranging said metal surface in spaced relation to said constructional parts of said vessel so that the resistance to current flow in said atmosphere, when ionized, in the region of said metal surface, is less than the corresponding resistance in all other regions in said vessel; initiating glow discharge within said vessel to heat said metal surface to a temperature of a least 100° C., said glow discharge covering portions of said constructional parts which are negative relative to said electrode; and after heating said metal surface to said temperature, adjusting at least one of the factors of voltage and gas pressure to cause current flow to increase in the region of said metal surface and to diminish in other regions, to a point at which the overall resistance between said electrode and metal surface decreases with increasing voltage therebetween.

3. In a process for establishing and maintaining a high current, low voltage glow discharge at a metal surface wherein said metal surface is positioned in a closed vessel containing a gaseous atmosphere having a pressure below atmospheric but equal to at least 1 mm. Hg, the constructional parts of said vessel including a lead-in to said metal surface which is insulated from the vessel wall, and an electrode, said metal surface and said electrode being connected with opposite poles of a source of electrical potential, and wherein a blow discharge is produced by an electric current between said electrode and said metal surface at a potential difference sufficient to cause a glow discharge without arcing; the steps of: arranging said metal surface in spaced relation to said constructional parts of said vessel so that the capacitance between said metal surface and said electrode is greater than the capacitance between said lead-in and any other constructional part; initiating glow discharge within said vessel to heat said metal surface to a temperature of at least 100° C., said glow discharge covering portions of said constructional parts which are negative relative to said electrode; and after heating said metal surface to said temperature, adjusting at least one of the factors of voltage and gas pressure to cause current flow to increase in the region of said metal surface and to diminish in other regions.

4. A process as defined in claim 3 wherein said glow discharge is maintained at a potential difference, between said electrode and metal surface, not exceeding 1000 volts.

5. A process as claimed in claim 1 wherein said metal surface and said constructional parts are arranged so that the distance between said metal surface and said electrode is small in comparison with the area of said metal surface and the distance between all voltage carrying parts and said vessel wall is much larger than said distance between the metal surface and the electrode.

6. A process as claimed in claim 1 wherein after said glow discharge has been adjusted so as to increase the current flow in the region of said metal surface and to diminish the current flow in other regions, the energy of transformation at said metal surface is regulated by periodically lowering the voltage.

7. Apparatus for establishing and maintaining a high current, low voltage glow discharge comprising a closed metallic vessel; a member having a conductive surface positioned in said vessel; controllable means for maintaining a gaseous atmosphere in said vessel at a selected sub-atmospheric pressure; an electrical lead-in, extending into said vessel but insulated therefrom and connecting said conductive surface to one pole of a source of potential; an electrode in said vessel, spaced from said conductive surface, and connected to the opposite pole of said source of potential; said electrode and metal surface being so spaced and arranged that the capacitance therebetween is greater than the capacitance between said lead-in and any other part of said apparatus.

8. Apparatus as defined in claim 7 wherein said lead-in includes a central conductor having an insulating bushing therearound, said bushing extending through an opening in a wall of said vessel and extending inwardly past the adjacent surface thereof; the inner portion of said vessel wall being radially spaced from said bushing to provide an annular gap therebetween; and the inner portion of said bushing being radially spaced from said central conductor to provide a second annular gap between said conductor and said vessel wall.

9. Apparatus as defined in claim 7 wherein said electrode at least partially encloses said conductive surface to thereby increase the capacity between said conductive surface and said electrode.

References Cited by the Examiner

UNITED STATES PATENTS

| | | | |
|---|---|---|---|
| 2,497,213 | 2/1950 | Downing | 313—7 X |
| 2,820,946 | 1/1958 | Robinson | 313—7 X |

FOREIGN PATENTS

| | | |
|---|---|---|
| 427,623 | 4/1935 | Great Britain. |
| 529,544 | 11/1940 | Great Britain. |

HYLAND BIZOT, *Primary Examiner.*

GEORGE N. WESTBY, *Examiner.*